United States Patent
Wong

(10) Patent No.: US 11,342,985 B2
(45) Date of Patent: May 24, 2022

(54) METHOD FOR DETERMINING A COMMUNICATION PATH OF MILLIMETER WAVE SIGNAL, MEASUREMENT DEVICE AND MEASUREMENT CONTROLLER USING THE SAME

(71) Applicants: SHENZHEN FUTAIHONG PRECISION INDUSTRY CO., LTD., Shenzhen (CN); Chiun Mai Communication Systems, Inc., New Taipei (TW)

(72) Inventor: Kwo-Jyr Wong, New Taipei (TW)

(73) Assignees: SHENZHEN FUTAIHONG PRECISION INDUSTRY CO., LTD., Shenzhen (CN); Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/837,127

(22) Filed: Apr. 1, 2020

(65) Prior Publication Data

US 2021/0006324 A1    Jan. 7, 2021

Related U.S. Application Data

(60) Provisional application No. 62/869,154, filed on Jul. 1, 2019.

(51) Int. Cl.
*H04B 7/155* (2006.01)
*H04W 16/28* (2009.01)
(Continued)

(52) U.S. Cl.
CPC ........ *H04B 7/1555* (2013.01); *H04B 7/0617* (2013.01); *H04B 17/101* (2015.01); *H04W 16/28* (2013.01)

(58) Field of Classification Search
CPC .. H04B 7/1555; H04B 17/101; H04B 7/0617; H04B 16/28; H04B 7/15557;
(Continued)

(56) References Cited

U.S. PATENT DOCUMENTS

2016/0119910 A1*  4/2016  Krzymien ............. H04L 5/0023
                                                          370/329
2017/0111805 A1*  4/2017  Barzegar ................ H01Q 19/08
(Continued)

FOREIGN PATENT DOCUMENTS

| CN | 102147455 | 2/2013 |
| CN | 102099696 | 3/2014 |
| CN | 107332594 | 11/2017 |

*Primary Examiner* — Mewale A Ambaye
(74) *Attorney, Agent, or Firm* — ScienBiziP, P.C.

(57) ABSTRACT

A method for determining a communication path of millimeter wave signal and measurement device using the method includes a first measuring device and a second measuring device. The first measurement device queries a list to determine a first AOD of the first measurement device corresponding to a LOS, and controls the array antenna of the first measurement device to send the millimeter wave signal at the first AOD of the first measurement device corresponding to the LOS to the second measurement device. The second measurement device queries the list to determine a first AOA of the second measurement device corresponding to the LOS, and controls the array antenna of the second measurement device to receive the millimeter wave signal at the first AOA of the first measurement device corresponding to the LOS. Thus, a downlink between the first measurement device and the second measurement device can be quickly established.

27 Claims, 9 Drawing Sheets

(51) Int. Cl.
*H04B 17/10* (2015.01)
*H04B 7/06* (2006.01)

(58) Field of Classification Search
CPC ...... H04B 7/0639; H04B 17/00; H04B 7/043; H04B 7/088; H04B 7/0695; H04B 17/309; H04W 16/00; H04W 72/046; H04W 16/28; H01Q 3/00
See application file for complete search history.

(56) References Cited

U.S. PATENT DOCUMENTS

| | | | |
|---|---|---|---|
| 2018/0227898 A1* | 8/2018 | Noh | H04B 7/088 |
| 2019/0104549 A1* | 4/2019 | Deng | H04W 72/0446 |
| 2019/0123996 A1* | 4/2019 | Gomadam | H04L 41/12 |
| 2020/0064432 A1* | 2/2020 | Wong | H04W 16/28 |
| 2020/0145079 A1* | 5/2020 | Marinier | H04B 7/0456 |
| 2021/0006324 A1* | 1/2021 | Wong | H04W 16/28 |

* cited by examiner

METHOD FOR DETERMINING A COMMUNICATION PATH OF MILLIMETER WAVE SIGNAL, MEASUREMENT DEVICE AND MEASUREMENT CONTROLLER USING THE SAME

CROSS-REFERENCE TO RELATED APPLICATIONS

This application claims priority to U.S. provisional Patent Application No. 62/869,154 filed on Jul. 1, 2019, the contents of which are incorporated by reference herein.

FIELD

The subject matter herein generally relates to communication field, especially relates to a method for determining a communication path of millimeter wave signal, a measurement device and a measurement controller using the same.

BACKGROUND

In the prior art, there is no measurement method for measuring angles of arrival and departure of millimeter wave signals, and a transfer condition between two measurement devices, nor relationship between such angles within a range covered by a base station and the transfer condition.

BRIEF DESCRIPTION OF THE DRAWINGS

Implementations of the present disclosure will now be described, by way of embodiments, with reference to the attached figures.

DETAILED DESCRIPTION

Figure 1:
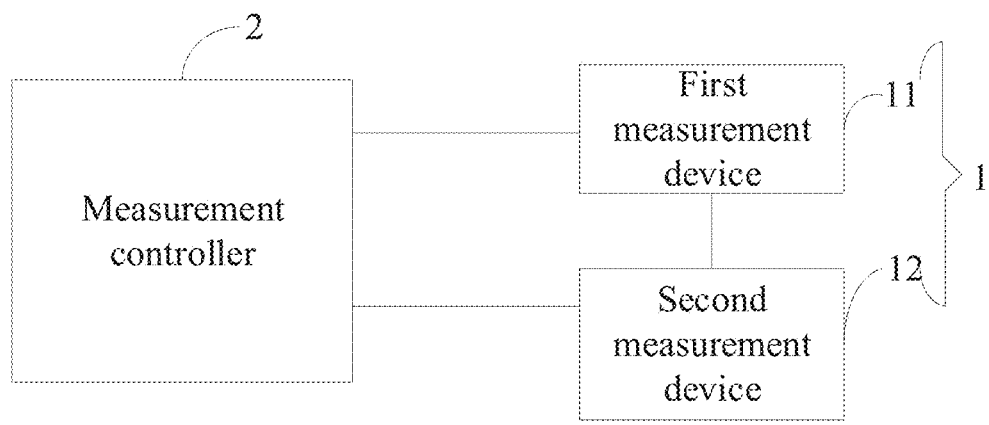
FIG. 1 is a block diagram of one embodiment of a running environment of a method for determining a communication path of millimeter wave signal.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

FIG. 1 illustrates an embodiment of a running environment of a method for determining a communication path of millimeter wave signal. The method runs in at least two measurement devices 1 and a measurement controller 2. The at least two measurement devices 2 communicate with the measurement controller 2 by a wireless signal. The at least two measurement devices 2 communicate with each other by a millimeter wave signal. In one embodiment, the at least two measuring devices 1 have the same effective or operative structure, one of the two measuring devices 1 is defined as a first measurement device 11 and the other is second measurement device 12. In one embodiment, the first measurement device 11 can be a mobile phone, and the second measurement device 12 can be a millimeter wave base station. The measurement controller 2 can be a macro base station.

Figure 2:
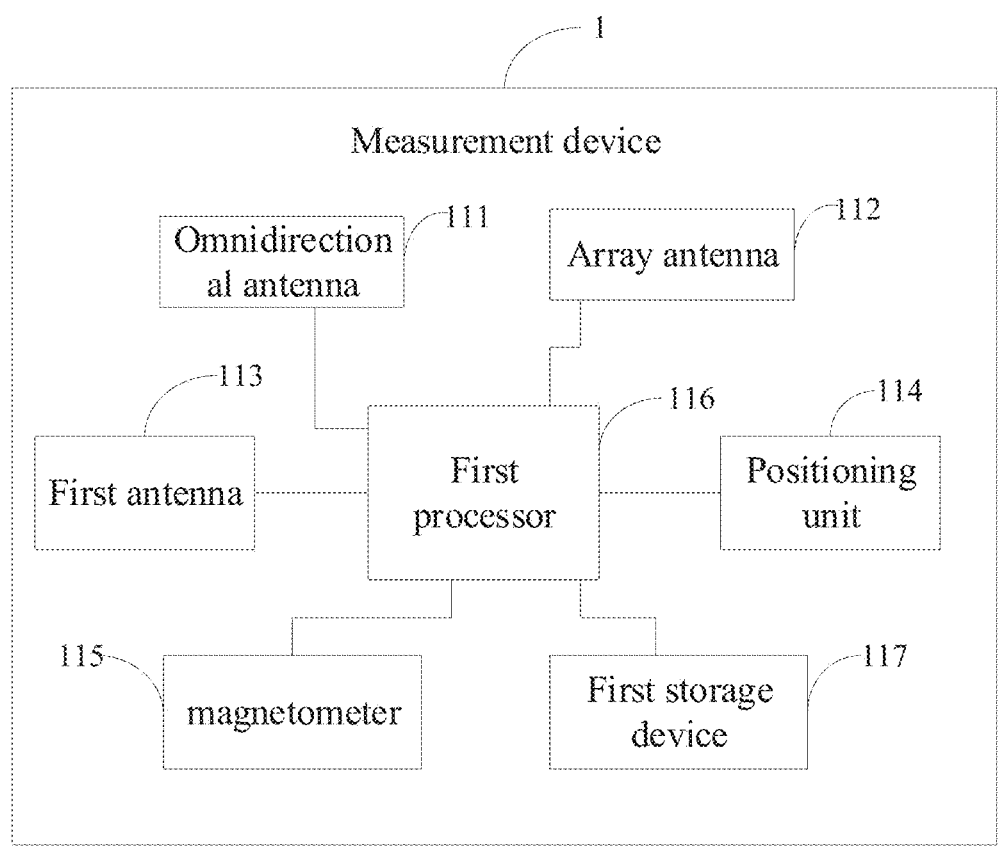
FIG. 2 is a block diagram of an embodiment of a measurement device for measuring millimeter wave signal of FIG. 1.

FIG. 2 illustrates the measurement device 1 of FIG. 1. The measurement device 1 includes an omnidirectional antenna 111, an array antenna 112, a first antenna 113, a positioning unit 114, a magnetometer 115, a first processor 116, and a first storage 117. In one embodiment, the omnidirectional antenna 111 can be a microstrip omnidirectional antenna. In one embodiment, the array antenna 112 can be a 3×1 array antenna with 16 channels. The array antenna 112 receives and sends signal by a set of channels and generates a beam of radio waves based on a set of digital or mixed beam forming process. The first antenna 113 is used to receive and transmit wireless signal, such as a control signal sent by the measurement controller 2. In one embodiment, the first antenna 113 receives low-frequency wireless signals in the 6 GHz range.

The positioning unit 114 obtains a position information of the measurement device 1. In one embodiment, the positioning unit 114 can be a GPS device, such as a differential GPS device. In another embodiment, the positioning unit 114 can be a Real-Time Kinematic system. The magnetometer 115 is used to measure an azimuth of the measurement device 1. In one embodiment, the magnetometer 115 measures a positive north direction of the measurement device 1 and regards the north direction as the azimuth (such as AOD or AOA) of the measurement device 1. The azimuth of the measurement device 1 measured by the magnetometer 115 measures is not limited to the north direction, the azimuth of measurement device1 can also be a positive south direction, a positive east direction, or a positive west direction.

In one embodiment, the first processor 116 controls the measurement device 1 to receive the millimeter wave signal by an omnidirectional antenna 111 or an array antenna 112, and to receive the wireless signal sent by the measurement controller 2 by the first antenna 113. In one embodiment, the first processor 116 is configured to execute program instructions installed in the measurement device 1 and control the measurement device 1 to execute corresponding actions. In at least one embodiment, the first processor 116 can be a central processing unit (CPU), a microprocessor, a digital signal processor, an application processor, a modem processor, or an integrated processor with an application processor and a modem processor integrated inside. In one embodiment, the first storage 117 is configured to store the data and program instructions installed in the measurement device 1. For example, the first storage 117 can be an internal storage system, such as a flash memory, a random access memory (RAM) for temporary storage of information, and/or a read-only memory (ROM) for permanent storage of information. In another embodiment, the first storage device 117 can also be an external storage system, such as a hard disk, a storage card, or a data storage medium. The first processor 116 is configured to execute program instructions installed in the measurement device 1 and control the measurement device 1 to execute corresponding actions.

Figure 3:
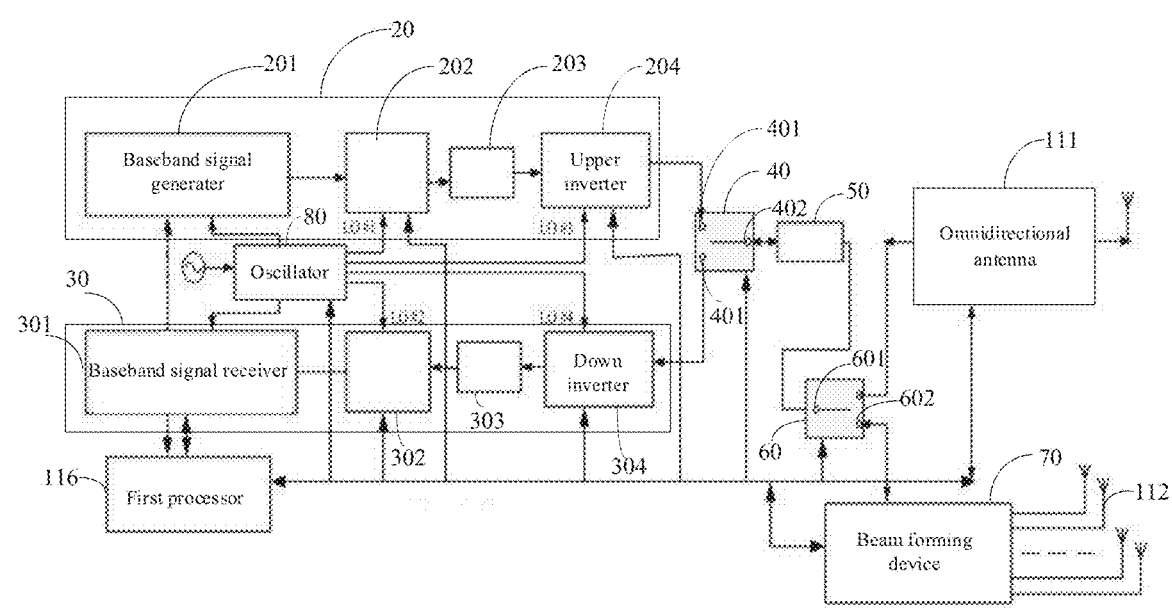
FIG. 3 is a structural schematic of the measurement device of FIG. 2.

FIG. 3 illustrates a structural schematic of the measurement device 1. The measurement device 1 includes a transmitter 20, a receiver 30, a first switch module 40, a band pass filter 50, a second switch module 60, and a beam forming device 70, and an oscillator 80 with lock-phase circuit. The first switch module 40 includes two first inputs 401 and one first output 402. The two first inputs 401 in the first switch module 40 can connect to the first output 402 respectively. The second switch module 60 includes a second input 601 and two second outputs 602. The second input 601 in the second switch module 60 can connect to the two second output 602 respectively. The transmitter 20 and the receiver 30 connect to the two first inputs 401 of the first switch module 40 respectively. The first output 402 of the first switch module 40 connects to the second input 601 of the second switch module 60 by the band-pass filter 50. The two second outputs 602 of the second switch module 60 connect to the omnidirectional antenna 111 and the beam forming device 70 respectively. The beam forming device 70 defines the array antenna 112.

In one embodiment, the transmitter 20 includes a baseband signal generator 201, a first intermediate frequency converter 202, a first band pass filter 203, and an upper inverter 204. The baseband signal generator 201 connects to the first intermediate frequency converter 202. The first intermediate frequency converter 202 connects to the first band pass filter 203. The first band pass filter 203 connects to the upper inverter 204. The upper inverter 204 connects to the first input 401 of the first switch module 40. The first output 402 of the first switch module 40 connects to the band pass filter 50. In one embodiment, the baseband signal generator 201 generates a baseband signal. The first intermediate frequency converter 202 can convert the generated baseband signal to an intermediate frequency signal. In one embodiment, the bandwidth of the intermediate frequency signal may be 2.4 GHz. The first band pass filter 203 is used to filter the intermediate frequency signal. In one embodiment, the bandwidth of the first band pass filter 203 is 2.4-2.4835 GHz. The upper inverter 204 can convert the intermediate frequency signal to a target frequency signal which can be a millimeter wave signal. The target frequency signal is transmitted by the first switch module 40 and the second switch module 60 and is sent by the omnidirectional antenna 111 or array antenna 112. The oscillator 80 connects to the baseband signal generator 201, the first intermediate frequency converter 202, and the upper inverter 204 respectively, and provides local carrier for the baseband signal generator 201, the first intermediate frequency converter 202, and the upper inverter 204.

In one embodiment, the receiver 30 includes a baseband signal receiver 301, a second intermediate frequency converter 302, a second band pass filter 303, and a down inverter 304. The baseband signal receiver 301 connects to the second intermediate frequency converter 302. The second intermediate frequency converter 302 connects to the second band pass filter 303, and the second band pass filter 303 connects to the down inverter 304. The down inverter 304 connects to the first input 601 of the second switch module 60. In one embodiment, the omnidirectional antenna 111 or array antenna 112 receives the millimeter wave signal, and transmits the millimeter wave signal by the second switch module 60 and the first switch module 40 to the down inverter 304. The down inverter 304 converts the millimeter wave signal to an intermediate frequency signal. The intermediate frequency signal is filtered by the second band pass filter 303 and is converted by the second intermediate frequency converter 302 to obtain a baseband signal. The baseband signal is transimitted to the baseband signal receiver 301. In one embodiment, the bandwidth of the second band pass filter 303 is 2.4-2.4835 GHz. In one embodiment, the baseband signal is a chirp signal. The bandwidth of the baseband signal can be 400 KHz, 1.6 MHz, 20 MHz, 80 MHz, or 500 MHz. In one embodiment, the oscillator 80 connects to the baseband signal receiver 301, the second intermediate frequency converter 302 and the down inverter 304 respectively, and provide local carrier for the baseband signal receiver 301, the second intermediate frequency converter 302 and the down inverter 304. In one embodiment, the first processor 116 connects to the baseband signal generator 201, the baseband signal receiver 301, the oscillator 80, the first intermediate frequency converter 202, the second intermediate frequency converter 302, the upper inverter 204, the down inverter 304, the first switch module 40, the second switch module 60, the omnidirectional Antenna 111, and the beam forming device 70.

Figure 4:
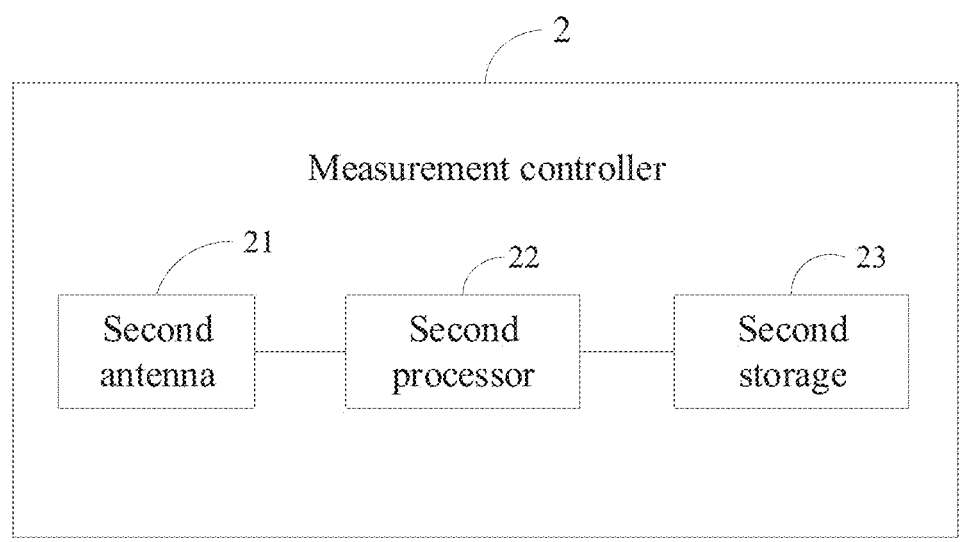
FIG. 4 is a block diagram of one embodiment of a measurement controller of FIG. 1.

FIG. 4 illustrates an embodiment of the measurement controller 2. In one embodiment, the measurement controller 2 includes a second antenna 21, a second processor 22, and a second storage 23. The second antenna 21 is used to receive and transmit wireless signal, for example, the measurement controller 2 can send control instructions to the measurement device 1 by the second antenna 21. In one embodiment, second processor 22 is configured to execute program instructions installed in the measurement controller 2 and control the measurement controller 2 to execute corresponding actions. In at least one embodiment, the second processor 22 can be a CPU, a microprocessor, a digital signal processor, an application processor, a modem processor, or an integrated processor with an application processor and a modem processor integrated inside. In one embodiment, the second storage 23 is configured to store the data and program instructions installed in the measurement controller 2. For example, the second storage 23 can be an internal storage system, such as a flash memory, a RAM for temporary storage of information, and/or a ROM for permanent storage of information. In another embodiment, the second storage 23 can also be an external storage system, such as a hard disk, a storage card, or a data storage medium.

Figure 5:
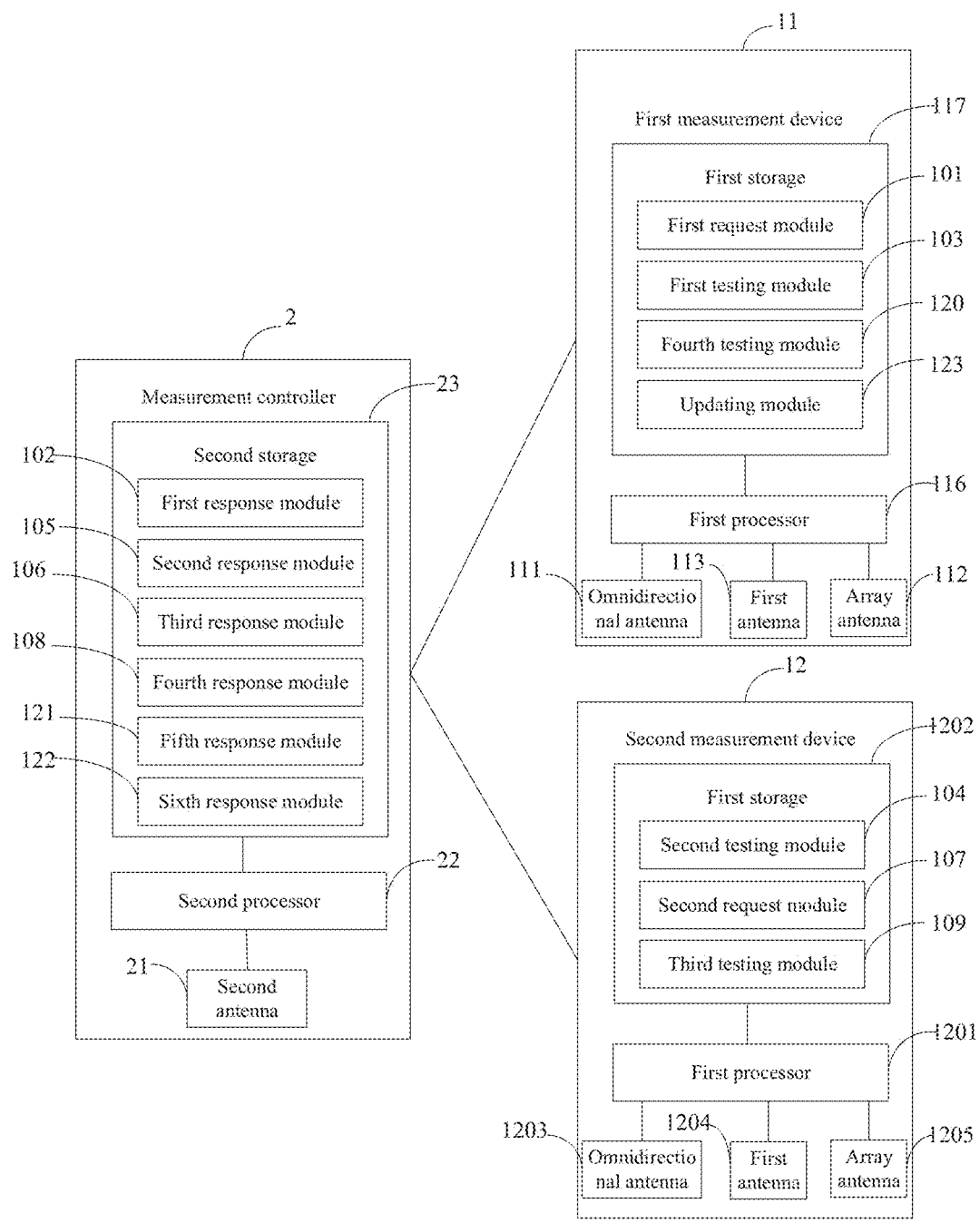
FIG. 5 illustrates an embodiment of modules included in the measurement controller, the first measurement device and the second measurement device.

FIG. 5 illustrates an embodiment of modules included in the measurement controller 2, the first measurement device 11 and the second measurement device 12. In one embodiment, the first measurement device 11 includes a first request module 101, a first testing module 103, a fourth testing module 120, an updating module 123. The first request module 101, the first testing module 103, the fourth testing module 120, and the updating module 123 are stored in the first storage 117 of the first measurement device 11 and executed by the first processor 116 of the first measurement device 11. In one embodiment, the first processor 116 of the first measurement device 11 controls the omnidirectional antenna 111 or the array antenna 112 to send millimeter wave signal to the second measurement device 12 or receive millimeter wave signal from the second measurement device 12. The first processor 116 of the first measurement device 11 controls the first antenna 113 to send wireless signal to the measurement controller 2 or receive wireless signal from the measurement controller 2. In one embodiment, the second measurement device 12 includes a second testing module 104, a second request module 107, and a third testing module 109. In one embodiment, the second testing module 104, the second request module 107, and the third testing module 109 are stored in the first storage 1202 of the second measurement device 12 and executed by the first processor 1201 of the second measurement device 12. In one embodiment, the first processor 1201 of the second measurement device 12 controls the omnidirectional antenna 1203 or the array antenna 1205 to send millimeter wave signal to the first measurement device 11 or receive millimeter wave signal from the first measurement device 11. The first processor 1203 of the second measurement device 12 controls the first antenna 1204 to send wireless signal to the measurement controller 2 or receive wireless signal from the measurement controller 2. In one embodiment, the measurement controller 2 includes a first response module 102, a second response module 105, a third response module 106, a fourth response module 108, a fifth response module 121, and a sixth response module 122. In one embodiment, the first response module 102, the second response module 105, the third response module 106, the fourth response module 108, the fifth response module 121, and the sixth response module 122 are stored in the second storage 23 and executed by the second processor 22 of the measurement controller 2. In one embodiment, the second processor 22 of the measurement controller 2 can control the second antenna 21 to receive wireless signal from the first measurement device 11 or from the second measurement device 12, or to send wireless signal to the first measurement device 11 and the second measurement device 12. In on embodiment, the first request module 101, the first testing module 103, the fourth testing module 120, and the updating module 123 are a program segment or code embedded in the first processor 116 of the first measurement device 1, and the second testing module 104, the second request module 107, and the third testing module 109 are a program segment or code embedded in the first processor 1201 of the second measurement device 12. In one embodiment, the first response module 102, the second response module 105, the third response module 106, the fourth response module 108, the fifth response module 121, and the sixth response module 122 are a program segment or code embedded in the second processor 22 of the measurement controller 2.

The first requesting module 101 sends a first testing request signal to the measurement controller 2. In one embodiment, the first testing request signal contains the position information of the first measurement device 11.

In one embodiment, the first requesting module 101 sends the first testing request signal containing the position information of the first measurement device 11 to the measurement controller 2 by the first antenna 113 in the first measurement device 11.

The first response module 102 generates a first testing instruction and a second testing instruction according to the first testing request signal sent by the first measurement device 11, and sends the first testing instruction to the first measurement device 11, and sends the second testing instruction to the second measurement device 12.

In one embodiment, the first response module 102 receives the first testing request signal by the second antenna 21 of the measurement controller 2, generates the first and second testing instructions according to the received first testing request signal. The first testing instruction is sent by the second antenna 21 to the first measurement device 11, and the second testing instruction is sent by the second antenna 21 to the second measurement device 12, and stores the position information of the first measurement device 11.

The first testing module 103 receives the first testing instruction sent by the measurement controller 2 and controls the omnidirectional antenna 111 of the first measurement device 11 to send a millimeter wave signal to the second measurement device 12.

The second testing module 104 receives the second testing instruction sent by the measurement controller 2 and controls the array antenna 1205 of the second measurement device 12 to receive the millimeter wave signal sent by the first measurement device 11 according to the second testing instruction. The second testing module 104 determines at least one first angle of arrival (AOA) of a beam of the millimeter wave signal according to a signal strength or a Received Signal Strength Indication (RSSI) of the received millimeter wave signal, and sends the at least one first AOA to the measurement controller 2.

In one embodiment, the array antenna 112 of the first measurement device 11 or the array antenna 1205 of the second measurement device 12 has four sectors, each sector of the four sectors has at least one sector antenna. The second testing module 104 controls the sector antennas in the four sectors of the array antenna 112 to scan and receive the millimeter wave signal sent by the first measurement device 11 at different AOAs according to the second testing instruction sent by the measurement controller 2. The second testing module 104 determines an AOA of the received millimeter wave signal as a first AOA when the signal strength or RSSI of millimeter wave signal corresponding to the AOA exceeds a threshold, and sends the first AOA and the position information of the second measurement device 12 to the measurement controller 2. In one embodiment, the second testing module 104 controls the sector antennas of the four sectors to scan within a preset cycle and to receive the millimeter wave signal sent by the first measurement device 11 at different AOAs of the beam by the sector antennas. In one embodiment, the sector antennas of the four sectors scan and receive the millimeter wave sent by the first measurement device 11 at 0 to 90 degrees, 90 to 180 degrees, 180 to 270 degrees, and 270 to 360 degrees respectively. In one embodiment, the sector antenna has a 1×16 or 1×8 antenna structure.

In one embodiment, the array antenna 112 has three sectors, each sector of the three sectors has a sector antenna. The second testing module 104 controls the sector antenna in the three sectors of the array antenna 1205 in the second measurement device 12 to scan and receive the millimeter wave signal sent by the first measurement device 11 at different AOAs according to the second testing instruction sent by the measurement controller 2. In one embodiment, the second testing module 104 controls the sector antennas of the three sectors to scan within the preset cycle and to receive the millimeter wave signal sent by the first measurement device 11 at different AOAs of the beam by the sector antenna. In one embodiment, the sector antennas of the three sectors scan and receive the millimeter wave sent by the first measurement device 11 at 0 to 120 degrees, 120 to 240 degrees, and 240 to 360 degrees respectively.

The second response module 105 receives and stores the first AOA sent by the second measurement device 12, generates a third testing instruction and a fourth testing instruction, sends the third testing instruction to the first measurement device 11, and sends the fourth testing instruction to the second measurement device 12.

In one embodiment, the first testing module 103 further receives the third testing instruction by the first antenna 113 of the first measurement device 11, and controls the first measurement device 11 to send the millimeter wave signal by the array antenna 112 at different angles of departure (AOD) of the beam according to the third testing instruction. In one embodiment, the first testing module 103 controls the sector antennas of the three sectors to scan within the preset cycle and send the millimeter wave signal to the second measurement device 12 at different AODs of the beam by the sector antenna. In one embodiment, when the sector antennas in the four sectors of the array antenna 112 in the first measurement device 11 perform scanning, the four sectors send the millimeter wave signal at different AODs of the beam by the sector antenna at 0 to 90 degrees, 90 to 180 degrees, 180 to 270 degrees, and 270 to 360 degrees respectively. In one embodiment, the first measurement device 11 and the second measurement device 12 are synchronized. The first measurement device 11 and the second measurement device 12 performs scanning synchronously.

The second testing module 104 receives the fourth testing instruction by the first antenna 1204 of the second measurement device 12, controls the second measurement device 12 to receives the millimeter wave signal at each first AOA by the array antenna 112.

Figure 6:
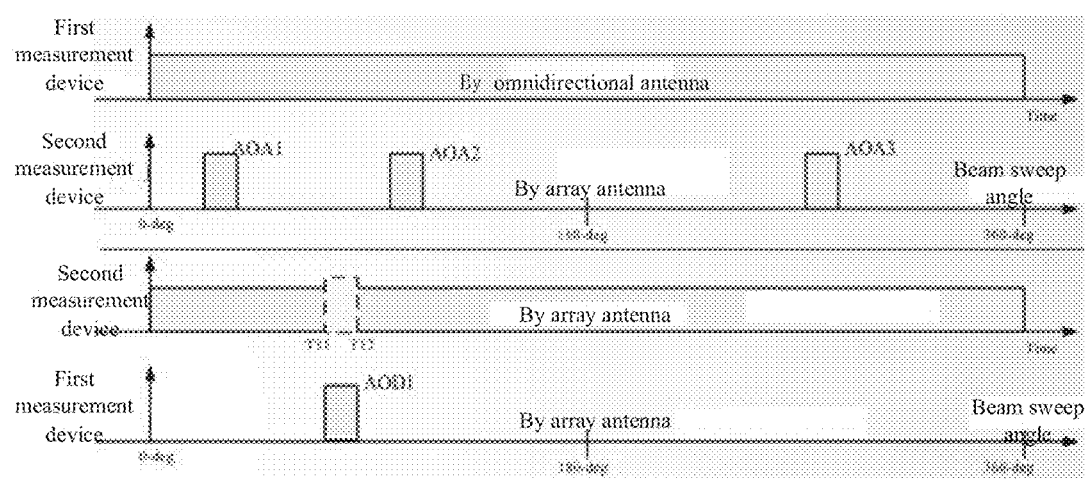
FIG. 6 illustrates a schematic of a millimeter wave signal transmitted by a first measurement device and a second measurement device.

FIG. 6 illustrates the millimeter wave signal transmitted by the first measurement device 11 and the second measurement device. In one embodiment, the second testing module 104 determines whether the signal strength of the received millimeter wave signal exceeds the threshold, records a first time period and a first signal strength when the signal strength of the received millimeter wave signal exceeds the threshold, and sends the first time period and the first signal strength to the measurement controller 2. In one embodiment, the first signal strength is a strength of the millimeter wave signal received by the second measurement device 12 at least one first AOA from the first measurement device 11 and the first signal strength exceeds the threshold, the first time period is a time period from a time when the array antenna 1205 of the second measurement device 12 scans to receive the millimeter wave signal sent by the first measurement device 11 to a time when the strength of the millimeter wave signal received by the second measurement device 12 is the first signal strength.

The third response module 106 receives the first time period and the first signal strength sent by the second measurement device 12, and sends the first time period and the first signal strength to the first measurement device 11. In one embodiment, the third response module 106 receives the first time period and the first signal strength and sends the first time period and the first signal strength by the second antenna 21.

The first testing module 103 determines a first AOD according to the first time period and the first signal strength sent by the measurement controller 2, and sends the first AOD to the measurement controller 2 by the first antenna of the first measurement device 11. In detail, the first testing module 103 determines the first AOD corresponding to the first time period within the preset cycle scan time when sector antennas of the three sectors of the first measurement device 11 scan. The first testing module 103 sends the first AOD to the measurement controller 2 by the first antenna 113 of the first measurement device 11.

The third response module 106 receives and stores the first AOD sent by the first measurement device 11, and generates a fifth testing instruction and a sixth testing instruction, and sends the fifth testing instruction to the first measurement device 11 and sends the sixth testing instruction to the second measurement device 12.

The first testing module 103 receives the fifth testing instruction, controls the array antenna 112 of the first measurement device 11 to send the millimeter wave signal at the first AOD to the second measurement device 12, and timing when the first measurement device 11 sends the millimeter wave signal at the first AOD to the second measurement device 12.

The second testing module 104 receives the sixth testing instruction, controls the array antenna 1205 of the second measurement device 12 to receive the millimeter wave signal at the first AOA, and sends a first feedback signal to the first measurement device 11 when receiving the millimeter wave signal at the first AOA.

The first testing module 103 stops timing to obtain a first time when receiving the first feedback signal sent by the second measurement device 12, and sends the first time to the measurement controller 2.

The third response module 106 calculates a first path time according to the first time and a formula Tt=T-Tap-Tbp, wherein, T is the first time, Tbp is a processing time when the second measurement device 12 processes the millimeter wave signal from the first measurement device 11, Tap is a processing time when the first measurement device 11 processes the first feedback signal from the second measurement device 12, Tt is the first path time. In one embodiment, as values of the Tap and the Tbp keep the same at different transfer conditions between the first measurement device 11 and the second measurement device 12. The values of the Tap and the Tbp can be determined at a known transfer conditions between the first measurement device 11 and the second measurement device 12.

Figure 7:
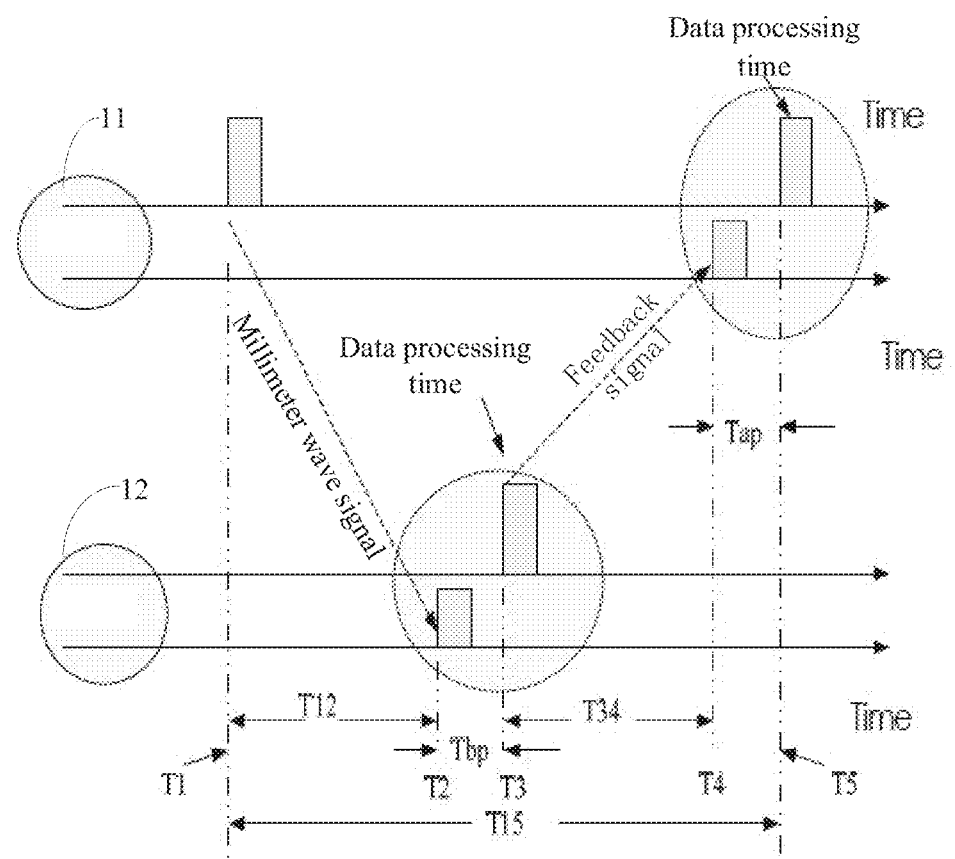
FIG. 7 illustrates a method for calculating a Tap and a Tbp.

FIG. 7 illustrates a method for calculating the total time of the Tap and the Tbp. In one embodiment, the method for calculating the total time of the Tap and the Tbp includes: placing the first measurement device 11 at a preset distance away from the second measurement device 12, such as the preset distance can be 20 meter; controlling the array antenna 112 of the first measurement device 11 to send a millimeter wave signal to the second measuring device 12, and timing; controlling the array antenna 1205 of the second measurement device 12 to receive the millimeter wave signal sent by the first measurement device 11, and send a first feedback signal to the first measurement device 11 after receiving the millimeter wave signal sent by the first measurement device 11; controlling the first measurement device 11 to stop timing when receiving the first feedback signal to obtain the time, wherein the time is T15, the T12 is a time period from the first measurement device 11 sending the millimeter wave signal to the second measuring device 12 receiving the millimeter wave signal sent by the first measurement device 11, the T34 is a time period from the second measurement device 12 sending the first feedback signal to the first measuring device 11 receiving the first feedback signal sent by the second measurement device 12; calculates the T12 and T34 according to formula T12=T34=d/C, wherein d is the preset distance between the first measurement device 11 and the second measurement device 12, C is the light speed; calculating the total time of the Tap and the Tbp according to formula T'=Tap+Tbp=T15−T12−T34.

The third response module 106 calculates a first distance according to the first path time and formula D=C×Tt/2, wherein C is the light speed, Tt is the first path time, the D is the first distance. The third response module 106 further calculates a second distance between the first measurement device 11 and the second measurement device 12 according to the position information of the first measurement device 11 and the position information of the second measurement device 12. The third response module 106 calculates the difference between the second distance and the first distance, and determines whether the calculated difference is in a preset distance range. When the calculated difference is in the preset distance range, the third response module 106 determines a transfer condition between the first measurement device 11 and the second measurement device 12 is the line of signal (LOS). When the calculated difference is not in the preset distance range, the third response module 106 determines the transfer condition between the first measurement device 11 and the second measurement device 12 is the not line of signal (NLOS). In the embodiment, the third response module 106 establishes a relationship between the position information of the first measurement device 11, the position information of the second measurement device 12, the first AOA of the second measurement device 12, the first AOD of the first measurement device 11, the transfer condition between the first measurement device 11 and the second measurement device 12 and stores the relationship in a list.

The first testing module 103 queries the list to determine a first AOD of the first measurement device 11 corresponding to the LOS, and controls the array antenna 111 of the first measurement device 11 to send the millimeter wave signal at the first AOD of the first measurement device 11 corresponding to the LOS to the second measurement device 12. The second testing module 104 queries the list to determine a first AOA of the second measurement device 12 corresponding to the LOS, and controls the array antenna 1205 of the second measurement device 12 to receive the millimeter wave signal at the first AOA of the first measurement device 11 corresponding to the LOS. Thus, a downlink between the first measurement device 11 and the second measurement device 12 can be quickly established, thus realizing a purpose of a quick communication link between the first measurement device 11 and the second measurement device 12.

The second requesting module 107 sends a second testing request signal to the measurement controller 2. In one embodiment, the second testing request signal contains the position information of the second measurement device 12.

In one embodiment, the second requesting module 107 sends the second testing request signal containing the position information of the second measurement device 12 to the measurement controller 2 by the first antenna 1204 in the second measurement device 12.

The fourth response module 108 generates a seventh testing instruction and an eighth testing instruction according to the second testing request signal sent by the second measurement device 12, and sends the seventh testing instruction to the second measurement device 12, and sends the eighth testing instruction to the first measurement device 11, and stores the position information of the second measurement device 12.

The third testing module 109 receives the seventh testing instruction sent by the measurement controller 2 and controls the omnidirectional antenna 1203 of the second measurement device 12 to send a millimeter wave signal to the first measurement device 11.

The fourth testing module 120 receives the eighth testing instruction sent by the measurement controller 2 and controls the array antenna 112 of the first measurement device 11 to receive the millimeter wave signal sent by the second measurement device 12 according to the eighth testing instruction. The fourth testing module 120 determines at least one second angle of arrival (AOA) of a beam of the millimeter wave signal according to the signal strength or RSSI of the received millimeter wave signal, and sends the at least one second AOA and a position information of the first measurement device 11 to the measurement controller 2.

In one embodiment, the fourth testing module 120 controls the sector antenna in the four sectors of the array antenna 112 of the first measurement device 11 to scan and receive the millimeter wave signal sent by the second measurement device 12 at different AODs according to the eighth testing instruction sent by the measurement controller 2. The fourth testing module 120 determines an AOA of the received millimeter wave signal as the second AOA when the signal strength or RSSI of millimeter wave signal corresponding to the AOA exceeds the threshold, and sends the second AOA and the position information of the first measurement device 11 to the measurement controller 2. In one embodiment, the fourth testing module 120 controls the sector antennas of the four sectors to scan within a preset cycle and to receive the millimeter wave signal sent by the second measurement device 12 at different AOAs of the beam by the sector antenna. In one embodiment, the sector antennas of the four sectors scan and receive the millimeter wave sent by the second measurement device 12 at 0 to 90 degrees, 90 to 180 degrees, 180 to 270 degrees, and 270 to 360 degrees respectively. In one embodiment, the sector antenna has a 1×16 or 1×8 antenna structure.

In one embodiment, the fourth testing module 120 controls the sector antenna in the three sectors of the array antenna 112 in the first measurement device 11 to scan and receive the millimeter wave signal sent by the second measurement device 12 at different AOAs according to the second testing instruction sent by the measurement controller 2. In one embodiment, the fourth testing module 120 controls the sector antennas of the three sectors to scan within the preset cycle and to receive the millimeter wave signal sent by the second measurement device 12 at different AOAs of the beam by the sector antenna. In one embodiment, the sector antennas of the three sectors scan and receive the millimeter wave sent by the second measurement device 12 at 0 to 120 degrees, 120 to 240 degrees, and 240 to 360 degrees respectively.

The fifth response module 121 receives and stores the second AOA sent by the first measurement device 11 and the position information of the first measurement device 11, generates a ninth testing instruction and a tenth testing instruction, sends the ninth testing instruction to the second measurement device 12, and sends the tenth testing instruction to the first measurement device 11.

In one embodiment, the third testing module 109 further receives the ninth testing instruction by the first antenna 1204 of the second measurement device 12, and controls the second measurement device 12 to send the millimeter wave signal by the array antenna 112 at different angles of departure (AOD) of the beam according to the ninth testing instruction. In one embodiment, the third testing module 109 controls the sector antennas of the three sectors in the second measurement device 12 to scan within the preset cycle and send the millimeter wave signal to the first measurement device 11 at different AODs of the beam by the sector antennas. In one embodiment, when the sector antennas in the four sectors of the array antenna 1205 in the second measurement device 12 perform scanning, the four sectors send the millimeter wave signal at different AODs of the beam by the sector antenna at 0 to 90 degrees, 90 to 180 degrees, 180 to 270 degrees, and 270 to 360 degrees respectively.

The fourth testing module 120 receives the tenth testing instruction by the first antenna 113 of the first measurement device 11, controls the first measurement device 11 to receives the millimeter wave signal at each second AOA by the array antenna 112.

In one embodiment, the fourth testing module 120 determines whether the signal strength of the received millimeter wave signal exceeds the threshold, records a second time period and a second signal strength when the signal strength of the received millimeter wave signal exceeds the threshold, and sends the second time period and the second signal strength to the measurement controller 2. In one embodiment, the second signal strength is a strength of the millimeter wave signal received by the first measurement device 11 at least one second AOA from the second measurement device 12 and the second signal strength exceeds the threshold, the second time period is a time period from a time when the array antenna 112 of the first measurement device 11 scans to receive the millimeter wave signal sent by the second measurement device 12 to a time when the strength of the millimeter wave signal received by the first measurement device 11 is the second signal strength.

The sixth response module 122 receives the second time period and the second signal strength sent by the first measurement device 11, and sends the second time period and the second signal strength to the second measurement device 12. In one embodiment, the sixth response module 122 receives the second time period and the second signal strength and sends the second time period and the second signal strength by the second antenna 21 to the second measurement device 12.

The third testing module 109 determines a second AOD according to the second time period and the second signal strength sent by the measurement controller 2, and sends the second AOD to the measurement controller 2 by the first antenna 1204 of the second measurement device 12. In detail, the third testing module 109 determines the second AOD corresponding to the second time period within the preset cycle when the sector antennas of the three sectors of the second measurement device 12 scan. The third testing module 109 sends the second AOD to the measurement controller 2 by the first antenna 1204 of the second measurement device 12.

The sixth response module 122 receives and stores the second AOD sent by the second measurement device 12, and generates an eleventh testing instruction and a twelfth testing instruction, and sends the eleventh testing instruction to the second measurement device 12 and sends the twelfth testing instruction to the first measurement device 11.

The third testing module 109 receives the eleventh testing instruction, controls the array antenna 1205 of the second measurement device 12 to send the millimeter wave signal at the second AOD to the first measurement device 11, and timing when the second measurement device 12 sends the millimeter wave signal at the second AOD to the first measurement device 11.

The fourth testing module 120 receives the twelfth testing instruction, controls the array antenna 112 of the first measurement device 11 to receive the millimeter wave signal at the second AOA, and sends a second feedback signal to the second measurement device 12 when receiving the millimeter wave signal at the second AOA.

The third testing module 109 stops timing to obtain a second time when receiving the second feedback signal sent by the first measurement device 11, and sends the second time to the measurement controller 2.

The sixth response module 122 calculates a second path time according to the second time and formula $Tt'=T'-Tap'-Tbp'$, wherein, $T'$ is the second time, $Tbp'$ is a processing time when the first measurement device 11 processes the millimeter wave signal from the second measurement device 12, $Tap'$ is a processing time when the second measurement device 12 processes the second feedback signal from the first measurement device 11, $Tt'$ is the first path time.

In one embodiment, the sixth response module 122 calculates a third distance according to the second path time and formula $D'=C \times Tt'/2$, wherein C is the light speed, $Tt'$ is the second path time, the $D'$ is the third distance. The sixth response module 122 further calculates a fourth distance between the first measurement device 11 and the second measurement device 12 according to the position information of the first measurement device 11 and the position information of the second measurement device 12. The sixth response module 122 calculates the difference between the third distance and the fourth distance, and determines whether the calculated difference is in the preset distance range. When the calculated difference is in the preset distance range, the sixth response module 122 determines a transfer condition between the first measurement device 11 and the second measurement device 12 is LOS. When the calculated difference is not in the preset distance range, the sixth response module 122 determines the transfer condition between the first measurement device 11 and the second measurement device 12 is NLOS. In the embodiment, the sixth response module 122 establishes a relationship between the position information of the first measurement device 11, the position information of the second measurement device 12, the second AOA of the first measurement device 11, the second AOD of the second measurement device 12, the transfer condition between the first measurement device 11 and the second measurement device 12 and stores the relationship in the list.

The third testing module 109 queries the list to determine the second AOD of the second measurement device 12 corresponding to the LOS, and controls the array antenna 1205 of the second measurement device 12 to send the millimeter wave signal at the second AOD of the second measurement device 12 corresponding to the LOS to the first measurement device 11.

The fourth testing module 120 queries the list to determine a second AOA of the first measurement device 11 corresponding to the LOS, and controls the array antenna 111 of the first measurement device 11 to receive the millimeter wave signal at the second AOA of the second measurement device 12 corresponding to the LOS. Thus, an uplink between the first measurement device 11 and the second measurement device 12 can be quickly established, thus realizing a purpose of a quick communication link between the first measurement device 11 and the second measurement device 12.

In one embodiment, the updating module 123 determines whether the first measurement device 11 or the second measurement device 12 moves to a new position, and if so, the updating module 123 sends a new testing request signal containing the position information of the first measurement device 11 or the second measurement device 12 to the measurement controller 2. In one embodiment, a geographical area may be divided into several sub-regions of the same size, such as the sub-region having a size of 20 m×20 m. When determining that the first measurement device 11 or the second measurement device 12 moves to a new sub-region, the updating module 123 sends a new testing request signal containing the position information of the first measurement device 11 or the second measurement device 12 to the measurement controller 2.

Figure 8:
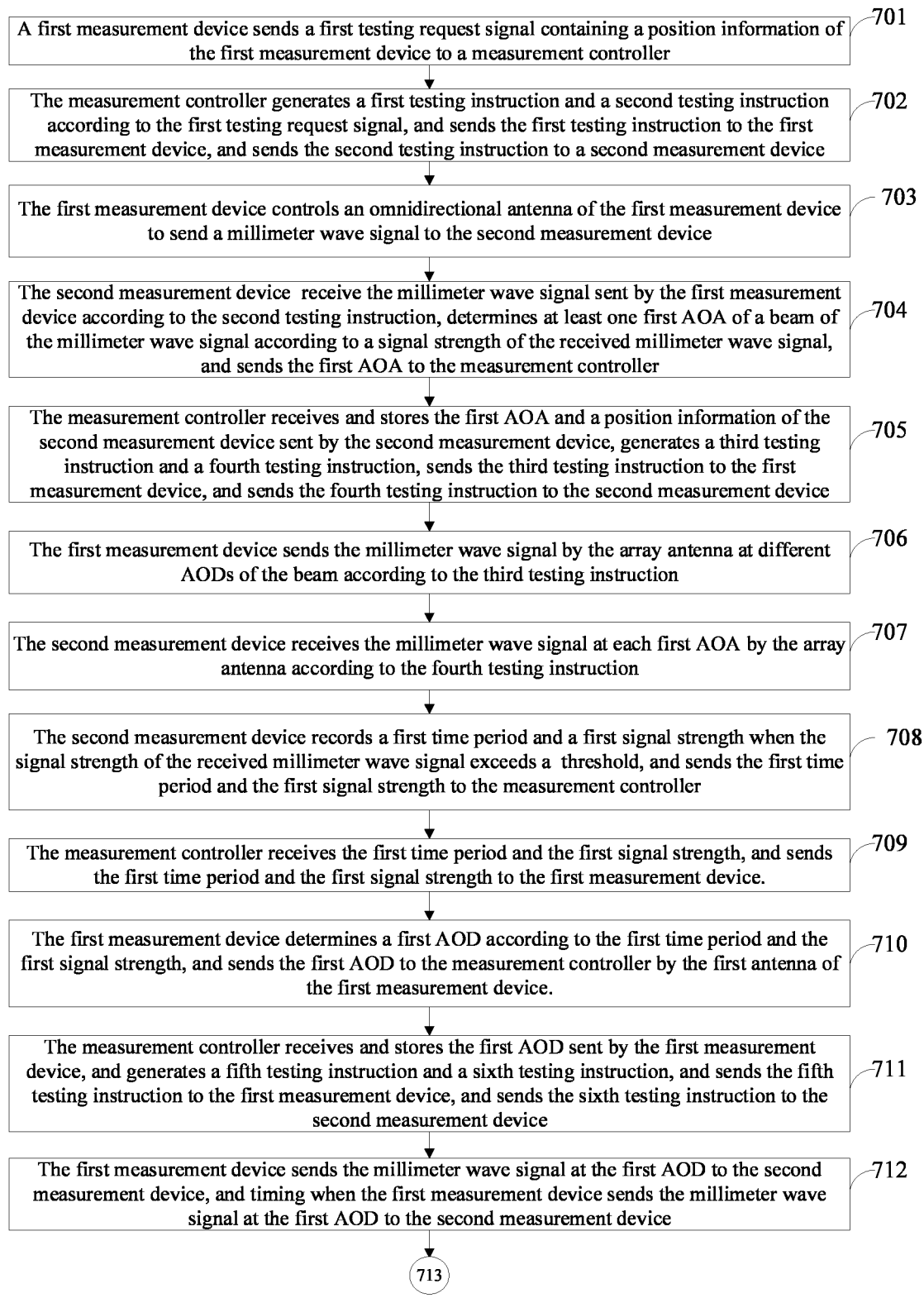
FIG. 8 illustrates a flowchart of one embodiment of a method for determining a communication path of millimeter wave signal.
Figure 8:
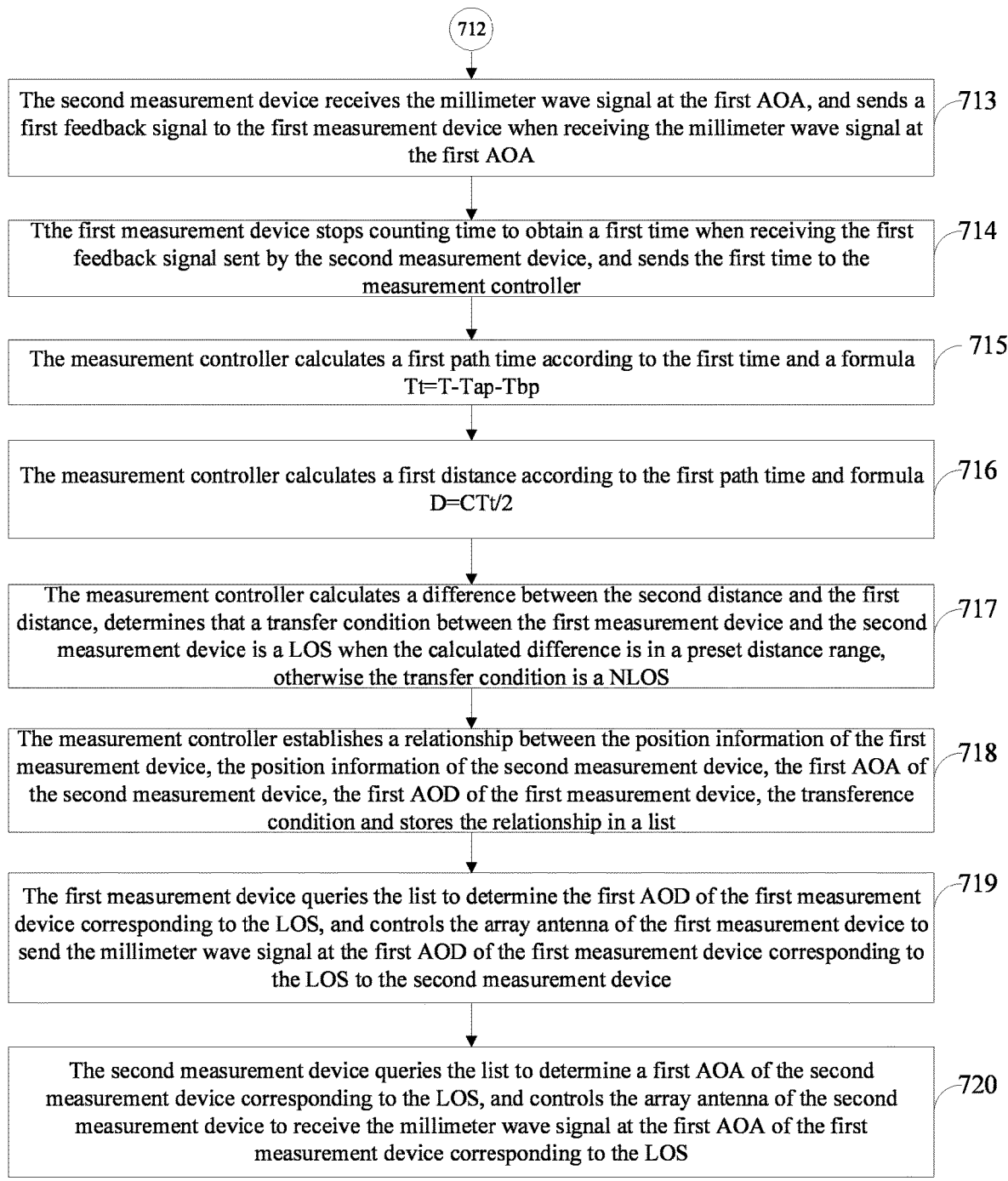

FIG. 8 illustrates a flowchart of one embodiment of a method for determining a communication path of millimeter wave signal. The method is provided by way of example, as there are a variety of ways to carry out the method. The method described below can be carried out using the configurations illustrated in FIGS. 1-7, for example, and various elements of these figures are referenced in explaining the example method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 701.

At block 701, a first measurement device sends a first testing request signal containing a position information of the first measurement device to a measurement controller.

In one embodiment, the first measurement device sends the first testing request signal to the measurement controller by the first antenna of the first measurement device.

At block 702, the measurement controller generates a first testing instruction and a second testing instruction according to the first testing request signal sent by the first measurement device, and sends the first testing instruction to the first measurement device, and sends the second testing instruction to a second measurement device, and stores the position information of the first measurement device.

In one embodiment, the measurement controller receives the first testing request signal by a second antenna of the measurement controller, generate the first and second testing instructions according to the received first testing request signal. The first testing instruction is sent by the second antenna to the first measurement device, and the second testing instruction is sent by the second antenna to the second measurement device, and stores the position information of the first measurement device.

At block 703, the first measurement device receives the first testing instruction sent by the measurement controller and controls an omnidirectional antenna of the first measurement device to send a millimeter wave signal to the second measurement device.

At block 704, the second measurement device controls the array antenna of the second measurement device to receive the millimeter wave signal sent by the first measurement device according to the second testing instruction, determines at least one first AOA of a beam of the millimeter wave signal according to a signal strength or a RSSI of the received millimeter wave signal, and sends the at least one first AOA to the measurement controller.

In one embodiment, the array antenna of the first measurement device or the second measurement device has four sectors, each sector of the four sectors has at least one sector antenna. The second measurement device controls the sector antennas in the four sectors of the array antenna to scan and receive the millimeter wave signal sent by the first measurement device at different AOAs according to the second testing instruction sent by the measurement controller. The second measurement device determines an AOA of the received millimeter wave signal as a first AOA when the signal strength or RSSI of millimeter wave signal corresponding to the AOA exceeds the threshold, and sends the first AOA and the position information of the second measurement device to the measurement controller. In one embodiment, the second measurement device controls the sector antennas of the four sectors to scan within a preset cycle and to receive the millimeter wave signal sent by the first measurement device at different AOAs of the beam by the sector antenna. In one embodiment, the sector antennas of the four sectors scan and receive the millimeter wave sent by the first measurement device at 0 to 90 degrees, 90 to 180 degrees, 180 to 270 degrees, and 270 to 360 degrees respectively. In one embodiment, the sector antenna has a 1×16 or 1×8 antenna structure.

In one embodiment, the array antenna of the first measurement device or the second measurement device has three sectors, each sector of the three sectors has a sector antenna. The second measurement device controls the sector antenna in the three sectors of the array antenna in the second measurement device to scan and receive the millimeter wave signal sent by the first measurement device at different AOAs according to the second testing instruction sent by the measurement controller. In one embodiment, the second measurement device controls the sector antennas of the three sectors to scan within the preset cycle and to receive the millimeter wave signal sent by the first measurement device at different AOAs of the beam by the sector antenna. In one embodiment, the sector antennas of the three sectors scan and receive the millimeter wave sent by the first measurement device at 0 to 120 degrees, 120 to 240 degrees, and 240 to 360 degrees respectively.

At block 705, the measurement controller receives and stores the first AOA and a position information of the second measurement device sent by the second measurement device, generates a third testing instruction and a fourth testing instruction, sends the third testing instruction to the first measurement device, and sends the fourth testing instruction to the second measurement device.

At block 706, the first measurement device further receives the third testing instruction by the first antenna of the first measurement device, and sends the millimeter wave signal by the array antenna at different AODs of the beam according to the third testing instruction. In one embodiment, the first measurement device controls the sector antennas of the three sectors to scan within the preset cycle and send the millimeter wave signal to the second measurement device at different AODs of the beam by the sector antennas. In one embodiment, when the sector antennas in the four sectors of the array antenna in the first measurement device perform scanning, the four sectors send the millimeter wave signal at different AODs of the beam by the sector antenna at 0 to 90 degrees, 90 to 180 degrees, 180 to 270 degrees, and 270 to 360 degrees respectively.

At block 707, the second measurement device receives the fourth testing instruction by the first antenna of the second measurement device, and receives the millimeter wave signal at each first AOA by the array antenna according to the fourth testing instruction.

At block 708, the second measurement device determines whether the signal strength of the received millimeter wave signal exceeds the threshold, records a first time period and a first signal strength when the signal strength of the received millimeter wave signal exceeds the threshold, and sends the first time period and the first signal strength to the measurement controller.

At block 709, the measurement controller receives the first time period and the first signal strength sent by the second measurement device, and sends the first time period and the first signal strength to the first measurement device. In one embodiment, the measurement controller receives the first time period and the first signal strength and sends the first time period and the first signal strength by the second antenna.

At block 710, the first measurement device receives the first time period and the first signal strength sent by the measurement controller, determines a first AOD according to the first time period and the first signal strength, and sends the first AOD to the measurement controller by the first antenna of the first measurement device. In detail, the first measurement device determines the first AOD corresponding to the first time period within the preset cycle when sector antennas of the three sectors of the first measurement device scan. The first measurement device sends the first AOD to the measurement controller by the first antenna of the first measurement device.

At block 711, the measurement controller receives and stores the first AOD sent by the first measurement device, and generates a fifth testing instruction and a sixth testing instruction, and sends the fifth testing instruction to the first measurement device and sends the sixth testing instruction to the second measurement device.

At block 712, the first measurement device receives the fifth testing instruction, controls the array antenna of the first measurement device to send the millimeter wave signal at the first AOD to the second measurement device, and timing when the first measurement device sends the millimeter wave signal at the first AOD to the second measurement device.

At block 713, the second measurement device receives the sixth testing instruction, controls the array antenna of the second measurement device to receive the millimeter wave signal at the first AOA, and sends a first feedback signal to the first measurement device when receiving the millimeter wave signal at the first AOA.

At block 714, the first measurement device stops timing to obtain a first time when receiving the first feedback signal sent by the second measurement device, and sends the first time to the measurement controller.

At block 715, the measurement controller calculates a first path time according to the first time and a formula Tt=T-Tap-Tbp, wherein, T is the first time, Tbp is a processing time when the second measurement device processes the millimeter wave signal from the first measurement device, Tap is a processing time when the first measurement device processes the first feedback signal from the second measurement device, Tt is the first path time.

At block 716, the measurement controller calculates a first distance according to the first path time and formula D=C× Tt/2, wherein C is the light speed, Tt is the first path time, D is the first distance, calculates a second distance between the first measurement device and the second measurement device according to the position information of the first measurement device and the position information of the second measurement device.

At block 717, the measurement controller calculates a difference between the second distance and the first distance, and determines whether the calculated difference is in a preset distance range, determines that a transfer condition between the first measurement device and the second measurement device is the line of signal (LOS) when the calculated difference is in the preset distance range, and determines that the transfer condition between the first measurement device and the second measurement device is the not line of signal (NLOS) when the calculated difference is not in the preset distance range.

At block 718, the measurement controller establishes a relationship between the position information of the first measurement device, the position information of the second measurement device, the first AOA of the second measurement device, the first AOD of the first measurement device, the transfer condition between the first measurement device and the second measurement device and stores the relationship in a list.

At block 719, the first measurement device queries the list to determine the first AOD of the first measurement device corresponding to the LOS, and controls the array antenna of the first measurement device to send the millimeter wave signal at the first AOD of the first measurement device corresponding to the LOS to the second measurement device.

At block 720, the second measurement device queries the list to determine a first AOA of the second measurement device corresponding to the LOS, and controls the array antenna of the second measurement device to receive the millimeter wave signal at the first AOA of the first measurement device corresponding to the LOS.

Thus, a downlink between the first measurement device and the second measurement device can be quickly established, thus realizing a purpose of a quick communication link between the first measurement device and the second measurement device.

In one embodiment, the method further includes: the second measurement device sends a second testing request signal containing the position information of the second measurement device to the measurement controller.

In one embodiment, the method further includes: the measurement controller generates a seventh testing instruction and an eighth testing instruction according to the second testing request signal sent by the second measurement device, and sends the seventh testing instruction to the second measurement device, and sends the eighth testing instruction to the first measurement device, and stores the position information of the second measurement device.

In one embodiment, the method further includes: the second measurement device receives the seventh testing instruction sent by the measurement controller and controls the omnidirectional antenna of the second measurement device to send a millimeter wave signal to the first measurement device in response to the seventh testing instruction.

In one embodiment, the method further includes: the first measurement device receives the eighth testing instruction sent by the measurement controller and controls the array antenna of the first measurement device to receive the millimeter wave signal sent by the second measurement device according to the eighth testing instruction, determines at least one second AOA of a beam of the millimeter wave signal according to the signal strength or RSSI of the received millimeter wave signal, and sends the at least one second AOA and a position information of the first measurement device to the measurement controller.

In one embodiment, the method further includes: the measurement controller receives and stores the second AOA sent by the first measurement device and the position information of the first measurement device, generates a ninth testing instruction and a tenth testing instruction, sends the ninth testing instruction to the second measurement device, and sends the tenth testing instruction to the first measurement device.

In one embodiment, the method further includes: the second measurement device further receives the ninth testing instruction by the first antenna of the second measurement device, and controls the second measurement device to send the millimeter wave signal by the array antenna at different AODs of the beam according to the ninth testing instruction. In one embodiment, the second measurement device controls the sector antennas of the three sectors in the second measurement device to scan within the preset cycle and send the millimeter wave signal to the first measurement device at different AODs of the beam by the sector antennas. In one embodiment, when the sector antennas in the four sectors of the array antenna in the second measurement device perform scanning, the four sectors send the millimeter wave signal at different AODs of the beam by the sector antenna at 0 to 90 degrees, 90 to 180 degrees, 180 to 270 degrees, and 270 to 360 degrees respectively.

In one embodiment, the method further includes: the first measurement device receives the tenth testing instruction by the first antenna of the first measurement device, and receives the millimeter wave signal at each second AOA by the array antenna according to the tenth testing instruction.

In one embodiment, the method further includes: the first measurement device determines whether the signal strength of the received millimeter wave signal exceeds the threshold, records a second time period and a second signal strength when the signal strength of the received millimeter wave signal exceeds the threshold, and sends the second time period and the second signal strength to the measurement controller.

In one embodiment, the method further includes: the measurement controller receives the second time period and the second signal strength sent by the first measurement device, and sends the second time period and the second signal strength to the second measurement device. In one embodiment, the measurement controller receives the second time period and the second signal strength and sends the second time period and the second signal strength by the second antenna to the second measurement device.

In one embodiment, the method further includes: the second measurement device determines a second AOD according to the second time period and the second signal strength sent by the measurement controller, and sends the second AOD to the measurement controller by the first antenna of the second measurement device. In detail, the second measurement device determines the second AOD corresponding to the second time period within the preset cycle when the sector antennas of the three sectors of the second measurement device scan. The second measurement device sends the second AOD to the measurement controller by the first antenna of the second measurement device.

In one embodiment, the method further includes: the measurement controller receives and stores the second AOD sent by the second measurement device, and generates an eleventh testing instruction and a twelfth testing instruction, and sends the eleventh testing instruction to the second measurement device, and sends the twelfth testing instruction to the first measurement device.

In one embodiment, the method further includes: the second measurement device receives the eleventh testing instruction, controls the array antenna of the second measurement device to send the millimeter wave signal at the second AOD to the first measurement device, and timing when the second measurement device sends the millimeter wave signal at the second AOD to the first measurement device.

In one embodiment, the method further includes: the first measurement device receives the twelfth testing instruction, controls the array antenna of the first measurement device to receive the millimeter wave signal at the second AOA, and sends a second feedback signal to the second measurement device when receiving the millimeter wave signal at the second AOA.

In one embodiment, the method further includes: the second measurement device stops timing to obtain a second time when receiving the second feedback signal sent by the first measurement device, and sends the second time to the measurement controller.

In one embodiment, the method further includes: the measurement controller calculates a second path time according to the second time and formula $Tt'=T'-Tap'-Tbp'$, wherein, T' is the second time, Tbp' is a processing time when the first measurement device processes the millimeter wave signal from the second measurement device, Tap' is a processing time when the second measurement device processes the second feedback signal from the first measurement device, Tt' is the first path time.

In one embodiment, the method further includes: the measurement controller calculates a third distance according to the second path time and formula $D'=C \times Tt'/2$, wherein C is the light speed, Tt' is the second path time, D' is the third distance; calculates a fourth distance between the first measurement device and the second measurement device according to the position information of the first measurement device and the position information of the second measurement device; calculates the difference between the third distance and the fourth distance, and determines whether the calculated difference is in the preset distance range; determines that the transfer condition between the first measurement device and the second measurement device is the LOS when the calculated difference is in the preset distance range, and determines that the transfer condition between the first measurement device and the second measurement device is the NLOS when the calculated difference is not in the preset distance range.

In one embodiment, the method further includes: the measurement controller establishes a relationship between the position information of the first measurement device, the position information of the second measurement device, the second AOA of the first measurement device, the second AOD of the second measurement device, the transfer condition between the first measurement device and the second measurement device and stores the relationship in the list.

In one embodiment, the method further includes: the second measurement device queries the list to determine the second AOD of the second measurement device corresponding to the LOS, and controls the array antenna of the second measurement device to send the millimeter wave signal at the second AOD of the second measurement device corresponding to the LOS to the first measurement device.

In one embodiment, the method further includes: the first measurement device queries the list to determine a second AOA of the first measurement device corresponding to the LOS, and controls the array antenna of the first measurement device to receive the millimeter wave signal at the second AOA of the second measurement device corresponding to the LOS.

Thus, an uplink between the first measurement device and the second measurement device can be quickly established, thus realizing a purpose of a quick communication link between the first measurement device and the second measurement device.

In one embodiment, the method further includes: the first measurement device 11 or the second measurement device 12 determines whether the first measurement device 11 or the second measurement device 12 moves to a new position, and if so, the first measurement device 11 or the second measurement device 12 sends a new testing request signal containing the position information of the first measurement device 11 or the second measurement device 12 to the measurement controller 2. In one embodiment, a geographical area may be divided into several sub-regions of the same size, such as the sub-region having a size of 20 m×20 m. When determining that the first measurement device 11 or the second measurement device 12 moves to a new sub-region, the first measurement device 11 or the second measurement device 12 sends a new testing request signal containing the position information of the first measurement device 11 or the second measurement device 12 to the measurement controller 2.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A measurement device comprising:
   an omnidirectional antenna;
   an array antenna;
   a first antenna;
   a processor connected to the omnidirectional antenna, the array antenna, and the first antenna; and
   a non-transitory storage medium coupled to the processor and configured to store a plurality of instructions, which cause the measurement device to:
   send a first testing request signal containing a position information of the measurement device to a measurement controller;
   receive a first testing instruction sent by the measurement controller and control the omnidirectional antenna of the measurement device to send a millimeter wave signal to another measurement device;
   receive a third testing instruction by the first antenna of the measurement device, and send the millimeter wave signal by the array antenna of the measurement device at different angles of departure (AODs) according to the third testing instruction;
   receive a first time period and a first signal strength sent by the measurement controller, determine a first AOD according to the first time period and the first signal strength, and send the first AOD to the measurement controller by the first antenna of the measurement device, wherein the first signal strength is a strength of the millimeter wave signal received by the another measurement device at least one first angle of arrival (AOA) exceeds a threshold, the first time period is a time period from a time when the array antenna of the another measurement device scans to receive the millimeter wave signal to a time when the strength of the millimeter wave signal exceeds the threshold.

2. The measurement device according to claim 1, wherein the plurality of instructions are further configured to cause the measurement device to:
   receive a fifth testing instruction, control the array antenna of the measurement device to send the millimeter wave signal at the first AOD to the another measurement device, and timing when the measurement device sends the millimeter wave signal at the first AOD to the another measurement device;
   stop timing to obtain a first time when receiving a feedback signal sent by the another measurement device, and send the first time to the measurement controller;
   query a list to determine the first AOD of the measurement device corresponding to a transfer condition which is Line Of Signal (LOS) and control the array antenna of the measurement device to send the millimeter wave signal at the first AOD of the measurement device corresponding to the LOS to the another measurement device, wherein, the list defines a correspondence between the position information of the measurement device, the position information of the another measurement device, the first AOA of the another measurement device, the first AOD of the measurement device, and the transfer condition between the measurement device and the another measurement device.

3. The measurement device according to claim 2, wherein the plurality of instructions are further configured to cause the measurement device to:
   control sector antennas of multiple sectors of the array antenna of the measurement device to scan within a preset cycle and send the millimeter wave signal to the another measurement device at different AODs by the sector antennas.

4. The measurement device according to claim 3, wherein the plurality of instructions are further configured to cause the measurement device to:
   determine the first AOD corresponding to the first time period within the preset cycle when the sector antennas of the multiple sectors of the array antenna scans.

5. The measurement device according to claim 2, wherein the plurality of instructions are further configured to cause the measurement device to:
   control the array antenna of the measurement device to receive the millimeter wave signal sent by the another measurement device according to a second testing instruction sent by the measurement controller, determine at least one first AOA of the millimeter wave signal according to a signal strength of the received millimeter wave signal, and send the at least one first AOA and a position information of the another measurement device to the measurement controller.

6. The measurement device according to claim 2, wherein the plurality of instructions are further configured to cause the measurement device to:
control the array antenna of the measurement device to receive the millimeter wave signal sent by the another measurement device according to a second testing instruction sent by the measurement controller, determine at least one second AOA of the millimeter wave signal according to a signal strength of the received millimeter wave signal from the another measurement device, and send the at least one second AOA to the measurement controller.

7. The measurement device according to claim 6, wherein the plurality of instructions are further configured to cause the measurement device to:
control sector antennas of multiple sectors of the array antenna to scan within a preset cycle and to receive the millimeter wave signal sent by the another measurement device at different AOAs by the sector antennas, determine an AOA of the received millimeter wave signal as the second AOA when the signal strength or RSSI of the millimeter wave signal corresponding to the AOA exceeds the signal strength threshold, and send the second AOA and the position information of the measurement device to the measurement controller.

8. The measurement device according to claim 7, wherein the plurality of instructions are further configured to cause the measurement device to:
receive a fourth testing instruction sent by the measurement controller, and receive the millimeter wave signal at each second AOA by the array antenna of the measurement device according to the fourth testing instruction;
determine whether the signal strength of the received millimeter wave signal exceeds the threshold, record a second time period and a second signal strength when the signal strength of the received millimeter wave signal exceeds the signal strength threshold, and send the second time period and the second signal strength to the measurement controller, wherein the second signal strength is a strength of the millimeter wave signal received by the measurement device at least one second AOA exceeds the threshold, the second time period is a time period from a time when the array antenna of the measurement device receives the millimeter wave signal sent by the another measurement device to a time when the strength of the millimeter wave signal exceeds the threshold.

9. The measurement device according to claim 8, wherein the plurality of instructions are further configured to cause the measurement device to:
receive a sixth testing instruction sent by the measurement controller, control the array antenna to receive the millimeter wave signal at the second AOA, and send a feedback signal to the another measurement device when receiving the millimeter wave signal at the second AOA.

10. The measurement device according to claim 9, wherein the plurality of instructions are further configured to cause the measurement device to:
query the list to determine a second AOA of the measurement device corresponding to the transfer condition which is the LOS, and control the array antenna of the measurement device to receive the millimeter wave signal at the second AOA of the measurement device corresponding to the LOS, wherein the list defines a correspondence between the position information of the measurement device, the position information of the another measurement device, the second AOA of the measurement device, the second AOD of the another measurement device, the transfer condition between the measurement device and the another measurement device.

11. The measurement device according to claim 2, wherein the plurality of instructions are further configured to cause the measurement device to:
determine whether the measurement device moves to a new position, and send a new testing request signal containing the position information of the measurement device to the measurement controller when the measurement device moves to the new position.

12. A measurement controller comprising:
a second antenna;
a processor connected to the second antenna; and
a non-transitory storage medium coupled to the processor and configured to store a plurality of instructions, which cause the measurement controller to:
generate a first testing instruction and a second testing instruction according to a first testing request signal containing a position information of a first measurement device, and send the first testing instruction to the first measurement device, and send the second testing instruction to a second measurement device by the second antenna;
receive and store a first angel of arrival (AOA) and a position information of the second measurement device sent by the second measurement device, generate a third testing instruction and a fourth testing instruction, send the third testing instruction to the first measurement device, and send the fourth testing instruction to the second measurement device;
receive a first time period and a first signal strength sent by the second measurement device, and send the first time period and the first signal strength to the first measurement device;
receive and store a first angel of departure (AOD) sent by the first measurement device, and generate a fifth testing instruction and a sixth testing instruction, and send the fifth testing instruction to the first measurement device and send the sixth testing instruction to the second measurement device;
calculate a first path time according to a formula $Tt=T-Tap-Tbp$, wherein, T is a first time sent by the first measurement device, Tbp is a processing time when the second measurement device processes the millimeter wave signal from the first measurement device, Tap is a processing time when the first measurement device processes a feedback signal from the second measurement device, Tt is the first path time;
calculate a first distance according to the first path time and formula $D=C \times Tt/2$, wherein C is the light speed, Tt is the first path time, D is the first distance;
calculate a second distance between the first measurement device and the second measurement device according to the position information of the first measurement device and the position information of the second measurement device;
calculate a difference between the second distance and the first distance, determine that a transfer condition between the first measurement device and the second measurement device is a Line Of Signal (LOS) when the calculated difference is in a preset distance range, and determine that the transfer condition is a Not Line of Signal (NLOS) when the calculated difference is not in the preset distance range; and establish a correspondence between the position information of the first measurement device, the position information of the second measurement device, the first AOA of the second measurement device, the first AOD of the first measurement device, the transfer condition between the first measurement device and the second measurement device and store the correspondence in a list.

13. The measurement controller according to claim 12, wherein the plurality of instructions are further configured to cause the measurement controller to:

receive a second testing request signal, generate a seventh testing instruction and an eighth testing instruction according to the second testing request signal, and send the seventh testing instruction to the second measurement device, and send the eighth testing instruction to the first measurement device;

receive and store a second AOA sent by the first measurement device, generate a ninth testing instruction and a tenth testing instruction, send the ninth testing instruction to the second measurement device, and send the tenth testing instruction to the first measurement device;

receive a second time period and a second signal strength sent by the first measurement device, and send the second time period and the second signal strength to the second measurement device;

receive and store the second AOD sent by the second measurement device, and generate an eleventh testing instruction and a twelfth testing instruction, and send the eleventh testing instruction to the second measurement device, and send the twelfth testing instruction to the first measurement device;

calculate a second path time according to a second time sent by the second measurement device and formula Tt'=T'− Tap'−Tbp', wherein, T' is the second time, Tbp' is a processing time when the first measurement device processes the millimeter wave signal from the second measurement device, Tap' is a processing time when the second measurement device processes the feedback signal from the first measurement device, Tt' is the first path time;

calculate a third distance according to the second path time and formula D'=C×Tt'/2, wherein C is the light speed, Tt' is the second path time, D' is the third distance;

calculate a fourth distance between the first measurement device and the second measurement device according to the position information of the first measurement device and the position information of the second measurement device;

calculate a difference between the third distance and the fourth distance, determine that the transfer condition between the first measurement device and the second measurement device is the LOS when the calculated difference is in the preset distance range, and determine that the transfer condition between the first measurement device and the second measurement device is the NLOS when the calculated difference is not in the preset distance range; and establish a correspondence between the position information of the first measurement device, the position information of the second measurement device, the second AOA of the first measurement device, the second AOD of the second measurement device, and the transfer condition between the first measurement device and the second measurement device.

14. A method for determining a communication path of millimeter wave signal comprising:

a measurement device sending a first testing request signal containing a position information of the measurement device to a measurement controller;

the measurement device receiving a first testing instruction sent by the measurement controller and controlling an omnidirectional antenna of the measurement device to send a millimeter wave signal to another measurement device;

the measurement device receiving a third testing instruction by a first antenna of the measurement device, and sending the millimeter wave signal by an array antenna of the measurement device at different angles of departure (AODs) according to the third testing instruction;

the measurement device receiving a first time period and a first signal strength sent by the measurement controller, determining a first AOD according to the first time period and the first signal strength, and sending the first AOD to the measurement controller by the first antenna of the measurement device, wherein the first signal strength is a strength of the millimeter wave signal received by the another measurement device at least one first angel of arrival (AOA) exceeds a threshold, the first time period is a time period from a time when the array antenna of the another measurement device scans to receive the millimeter wave signal to a time when the strength of the millimeter wave signal exceeds the threshold.

15. The measurement method according to claim 14 further comprising:

the measurement device receiving a fifth testing instruction, controlling the array antenna of the measurement device to send the millimeter wave signal at the first AOD to the another measurement device, and timing when the measurement device send the millimeter wave signal at the first AOD to the another measurement device;

the measurement device stopping timing to obtain a first time when receiving a feedback signal sent by the another measurement device, and sending the first time to the measurement controller;

the measurement device querying a list to determine the first AOD of the measurement device corresponding to a transfer condition which is Line Of Signal (LOS) and controlling the array antenna of the measurement device to send the millimeter wave signal at the first AOD of the measurement device corresponding to the LOS to the another measurement device, wherein, the list defines a correspondence between the position information of the measurement device, the position information of the another measurement device, the first AOA of the another measurement device, the first AOD of the measurement device, and the transfer condition between the measurement device and the another measurement device.

16. The measurement method according to claim 15 further comprising:

the measurement device controlling sector antennas of multiple sectors of the array antenna of the measurement device to scan within a preset cycle and sending the millimeter wave signal to the another measurement device at different AODs by the sector antennas.

17. The measurement method according to claim 16 further comprising:
the measurement device determining the first AOD corresponding to the first time period within the preset cycle when the sector antennas of the multiple sectors of the array antenna scans.

18. The measurement method according to claim 15 further comprising:
the measurement device controlling the array antenna of the measurement device to receive the millimeter wave signal sent by the another measurement device according to a second testing instruction sent by the measurement controller, determining at least one first AOA of the millimeter wave signal according to a signal strength of the received millimeter wave signal, and sending the at least one first AOA and a position information of the another measurement device to the measurement controller.

19. The measurement method according to claim 15 further comprising:
the measurement device controlling the array antenna of the measurement device to receive the millimeter wave signal sent by the another measurement device according to a second testing instruction sent by the measurement controller, determining at least one second AOA of the millimeter wave signal according to a signal strength of the received millimeter wave signal from the another measurement device, and send the at least one second AOA to the measurement controller.

20. The measurement method according to claim 19 further comprising:
the measurement device controlling sector antennas of the multiple sectors of the array antenna to scan within a preset cycle and to receive the millimeter wave signal sent by the another measurement device at different AOAs by the sector antenna, determining an AOA of the received millimeter wave signal as the second AOA when the signal strength of millimeter wave signal corresponding to the AOA exceeds the threshold, and sending the second AOA and the position information of the measurement device to the measurement controller.

21. The measurement method according to claim 20 further comprising:
the measurement device receiving a fourth testing instruction sent by the measurement controller, and receiving the millimeter wave signal at each second AOA by the array antenna of the measurement device according to the fourth testing instruction;
the measurement device determining whether the signal strength of the received millimeter wave signal exceeds the threshold, recording a second time period and a second signal strength when the signal strength of the received millimeter wave signal exceeds the threshold, and sending the second time period and the second signal strength to the measurement controller, wherein the second signal strength is a strength of the millimeter wave signal received by the measurement device at least one second AOA from the another measurement device exceeds the threshold, the second time period is a time period from a time when the array antenna of the measurement device receives the millimeter wave signal sent by the another measurement device to a time when the strength of the millimeter wave signal exceeds the second signal strength.

22. The measurement method according to claim 21 further comprising:
the measurement device receiving a sixth testing instruction sent by the measurement controller, controlling the array antenna to receive the millimeter wave signal at the second AOA, and sending a feedback signal to the another measurement device when receiving the millimeter wave signal at the second AOA.

23. The measurement method according to claim 22 further comprising:
the measurement device querying the list to determine a second AOA of the measurement device corresponding to the transfer condition which is the LOS, and controlling the array antenna of the measurement device to receive the millimeter wave signal at the second AOA of the measurement device corresponding to the LOS, wherein the list defines a correspondence between the position information of the measurement device, the position information of the another measurement device, the second AOA of the measurement device, the second AOD of the another measurement device, the transfer condition between the measurement device and the another measurement device.

24. The measurement method according to claim 15 further comprising:
the measurement device determining whether the measurement device moves to a new position, and sending a new testing request signal containing the position information of the measurement device to the measurement controller when the measurement device moves to the new position.

25. A method for determining a communication path of millimeter wave signal comprising:
a measurement controller generating a first testing instruction and a second testing instruction according to a first testing request signal containing a position information of a first measurement device, and sending the first testing instruction to the first measurement device, and sending the second testing instruction to a second measurement device by the second antenna;
the measurement controller receiving and storing a first angel of arrival (AOA) and a position information of the second measurement device sent by the second measurement device, generating a third testing instruction and a fourth testing instruction, sending the third testing instruction to the first measurement device, and sending the fourth testing instruction to the second measurement device;
the measurement controller receiving a first time period and a first signal strength sent by the second measurement device, and sending the first time period and the first signal strength to the first measurement device;
the measurement controller receiving and storing a first angle of departure (AOD) sent by the first measurement device, and generating a fifth testing instruction and a sixth testing instruction, and sending the fifth testing instruction to the first measurement device and sending the sixth testing instruction to the second measurement device;
the measurement controller calculating a first path time according to a formula $Tt=T-Tap-Tbp$, wherein, T is a first time sent by the first measurement device, Tbp is a processing time when the second measurement device processes the millimeter wave signal from the first measurement device, Tap is a processing time when the first measurement device processes a feedback signal from the second measurement device, Tt is the first path time;

the measurement controller calculating a first distance according to the first path time and formula D=C×Tt/2, wherein C is the light speed, Tt is the first path time, D is the first distance;

the measurement controller calculating a second distance between the first measurement device and the second measurement device according to the position information of the first measurement device and the position information of the second measurement device;

the measurement controller calculating a difference between the second distance and the first distance, determining that a transfer condition between the first measurement device and the second measurement device is a Line Of Signal (LOS) when the calculated difference is in a preset distance range, and determining that the transfer condition is a Not Line of Signal (NLOS) when the calculated difference is not in the preset distance range; and the measurement controller establishing a correspondence between the position information of the first measurement device, the position information of the second measurement device, the first AOA of the second measurement device, the first AOD of the first measurement device, the transfer condition between the first measurement device and the second measurement device and storing the correspondence in a list.

26. The measurement method according to claim 25 further comprising:

the measurement controller receiving a second testing request signal, generating a seventh testing instruction and an eighth testing instruction according to the second testing request signal, and sending the seventh testing instruction to the second measurement device, and sending the eighth testing instruction to the first measurement device;

the measurement controller receiving and storing a second AOA sent by the first measurement device, generating a ninth testing instruction and a tenth testing instruction, sending the ninth testing instruction to the second measurement device, and sending the tenth testing instruction to the first measurement device;

the measurement controller receiving a second time period and a second signal strength sent by the first measurement device, and sending the second time period and the second signal strength to the second measurement device;

the measurement controller receiving and storing the second AOD sent by the second measurement device, and generating an eleventh testing instruction and a twelfth testing instruction, and sending the eleventh testing instruction to the second measurement device, and sending the twelfth testing instruction to the first measurement device;

the measurement controller calculating a second path time according to a second time sent by the second measurement device and formula Tt'=T'− Tap'−Tbp', wherein, T' is the second time, Tbp' is a processing time when the first measurement device processes the millimeter wave signal from the second measurement device, Tap' is a processing time when the second measurement device processes the feedback signal from the first measurement device, Tt' is the first path time;

the measurement controller calculating a third distance according to the second path time and formula D'=C× Tt'/2, wherein C is the light speed, Tt' is the second path time, D' is the third distance;

the measurement controller calculating a fourth distance between the first measurement device and the second measurement device according to the position information of the first measurement device and the position information of the second measurement device;

the measurement controller calculating a difference between the third distance and the fourth distance, determining that the transfer condition between the first measurement device and the second measurement device is the LOS when the calculated difference is in the preset distance range, and determine that the transfer condition between the first measurement device and the second measurement device is the NLOS when the calculated difference is not in the preset distance range; and the measurement controller establishing a correspondence between the position information of the first measurement device, the position information of the second measurement device, the second AOA of the first measurement device, the second AOD of the second measurement device, and the transfer condition between the first measurement device and the second measurement device.

27. A measurement device comprising:

an array antenna;

a processor; and a non-transitory storage medium coupled to the processor and configured to store a plurality of instructions, which cause the measurement device to:

acquire a position information of the measurement device; and query a list to determine an angle of departure (AOD) of the measurement device corresponding to a transfer condition which is Line Of Signal (LOS) and control the array antenna of the measurement device to send a millimeter wave signal at the AOD to another measurement device, wherein, the list defines a correspondence between the position information of the measurement device, a position information of the another measurement device, an angle of arrival (AOA) of the another measurement device, the AOD of the measurement device, and the transfer condition between the measurement device and the another measurement device.

* * * * *